United States Patent Office 3,368,964
Patented Feb. 13, 1968

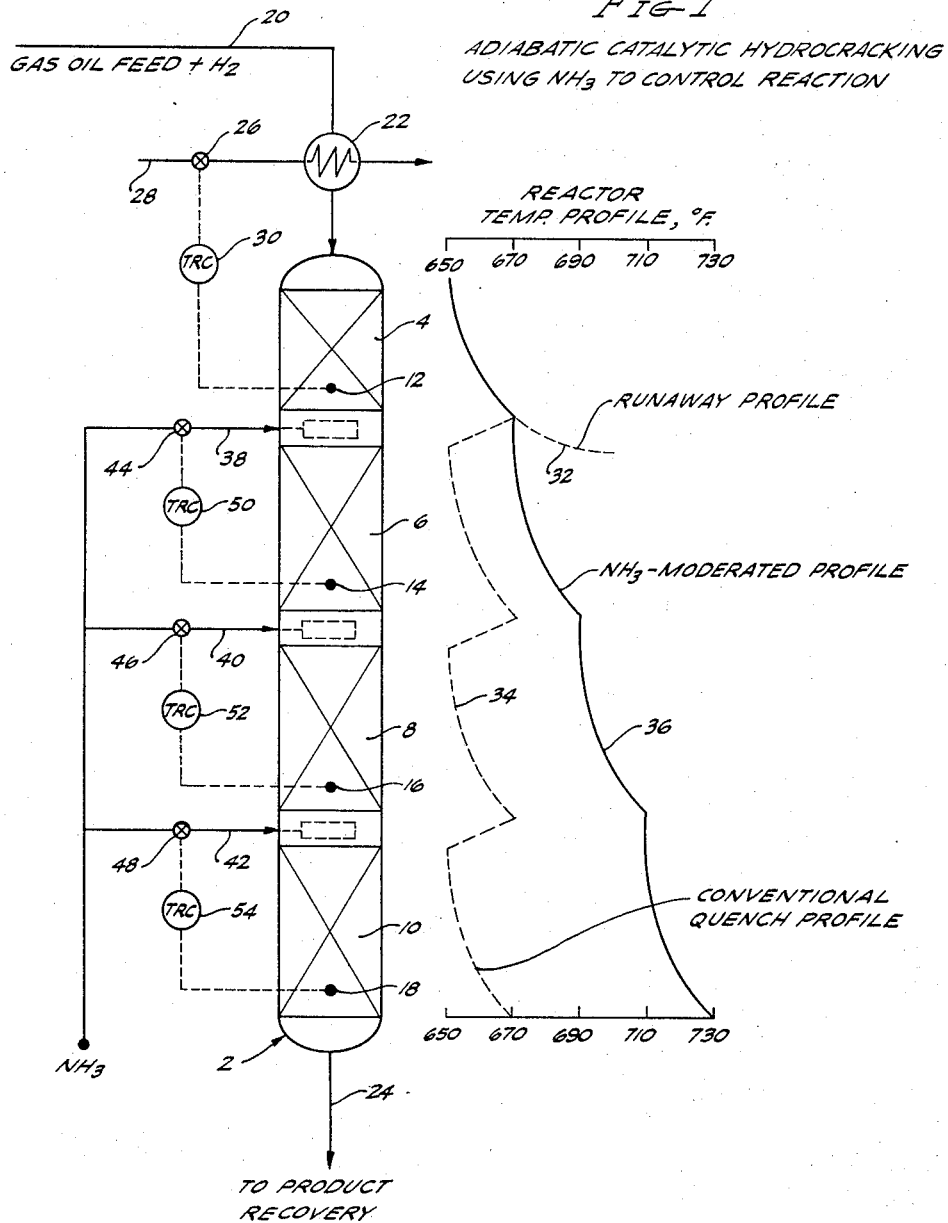

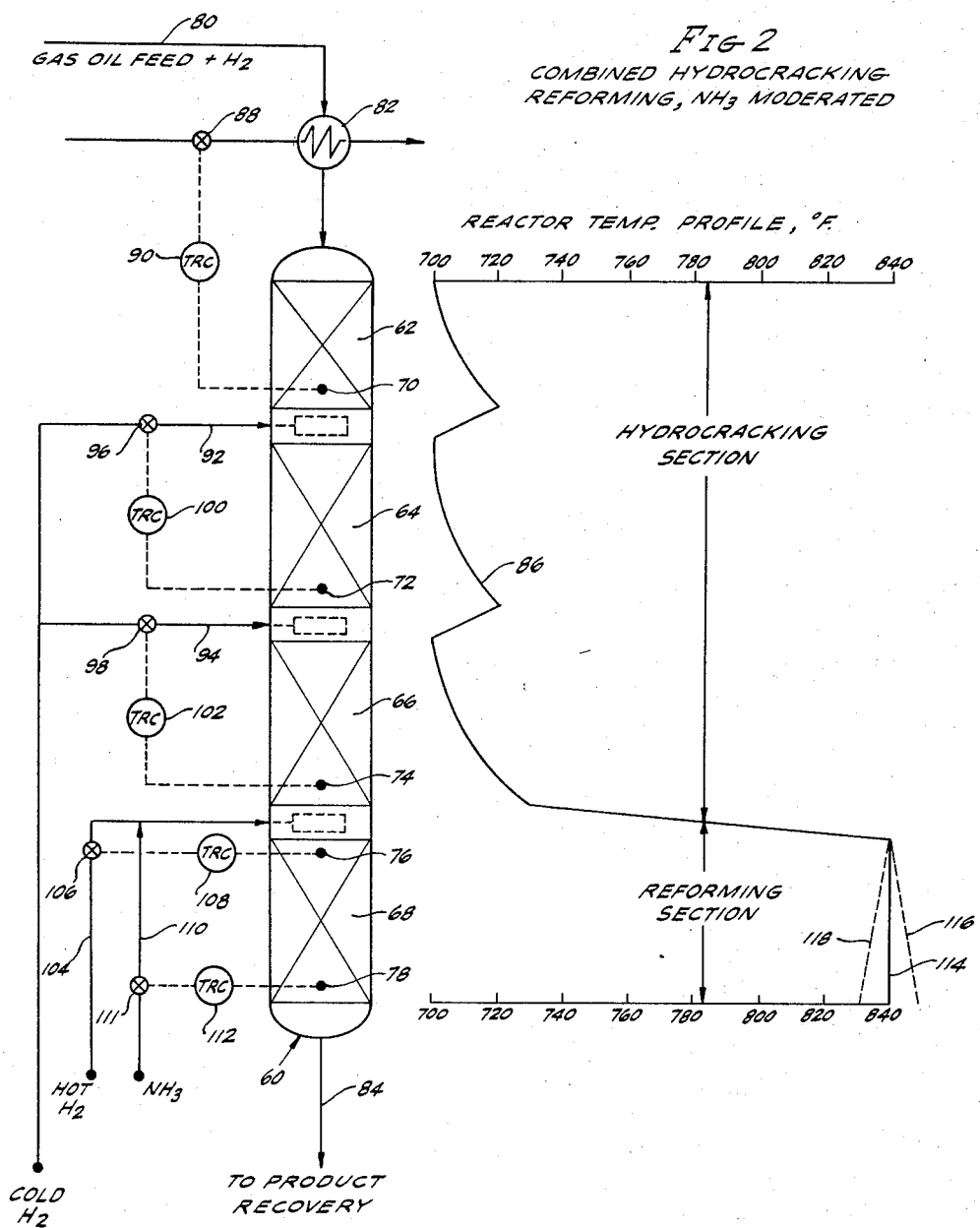

3,368,964
CATALYTIC HYDROCARBON CONVERSION PROCESS
Norman C. Ch'in and Robert H. Hass, Fullerton, Calif., assignors to Union Oil Company of California, Los Angeles, Calif., a corporation of California
Filed Sept. 27, 1965, Ser. No. 490,225
10 Claims. (Cl. 208—60)

This invention relates to the catalytic conversion of hydrocarbons at elevated temperatures and pressures in the presence of added hydrogen, such that substantial hydrocracking takes place. More particularly, the invention is concerned with novel methods for controlling temperatures in catalytic hydrocracking in such manner as to reduce or eliminate the need for thermal quenching, and to increase the aromaticity and octane number of the gasolines produced by hydrocracking.

In broad aspect the invention consists in passing the feedstock, e.g. gas oil, in admixture with hydrogen through a conversion zone at elevated pressures and temperatures in contact with a hydrocracking catalyst contained therein, while maintaining relatively low temperatures in an upstream portion of the conversion zone and relatively higher temperatures in a downstream portion thereof, and adding ammonia to the reactant stream at one or more intermediate points in order to control the rate of hydrocracking in the downstream portion. The high temperatures prevailing in the downstream portion of the conversion zone thermodynamically favor the production of a more aromatic product, while the added ammonia moderates the cracking activity of the catalyst (thus indirectly reducing the amount of exothermic olefin hydrogenation taking place) so that the higher prevailing temperatures will not initiate an uncontrollable exothermic reaction, commonly referred to as a "runaway." The high temperatures prevailing in the downstream section of the conversion zone may lie in the upper range of conventional hydrocracking temperatures, e.g. 700–800° F., or they may be elevated still further into the conventional reforming temperature range, e.g., 800–950° F.

Two principal modes are contemplated (or any combination of the two) for maintaining the differential temperatures in the conversion zone. Firstly, the exothermic heat generated in the upstream portion of the reactor may be allowed to accumulate adiabatically, thus eliminating or reducing the conventional thermal quenching normally required in exothermic processes, and secondly, extraneous heat may be added to the reactant stream at one or more intermediate points, as by the injection of heating fluids such as hot hydrogen. The specific advantages and limitations of each of these modes will be pointed out hereinafter.

A critical aspect of the invention resides in the use throughout the conversion zone of a highly active hydrocracking catalyst comprising a Group VI-B and/or Group VIII metal hydrogenating component deposited upon a solid refractory cracking base having an activity greater than that corresponding to a Cat-A activity index of 40. Only when catalysts of this nature are employed has it been found feasible to employ the ammonia-moderation technique without resorting to extremely low space velocities, entailing inordinately large volumes of catalyst.

A principal object of the invention is to provide economical means for increasing the aromaticity and octane value of gasolines produced by hydrocracking. A second important objective is to reduce or eliminate the need for interstage thermal quenching to prevent runaways in catalytic hydrocracking processes. Other objectives will become apparent from the detailed description which follows.

Conventional catalytic hydrocracking processes suffer from the general disadvantage that a relatively saturated, low-octane gasoline product is normally produced, which must then be subjected to extensive catalytic reforming to produce the required high-octane gasolines. The low aromatic content of hydrocracked gasolines is a result of the high pressures and/or low temperatures required in such processes. The older and less active types of hydrocracking catalysts normally required pressures in excess of about 4,000 p.s.i.g., and under those conditions extensive hydrogenation of aromatics occurs even though high temperatures in the neighborhood of 800–900° F. are employed. One of the principal economic objectives in hydrocracking processes has been to reduce the operating pressure required. This objective has to a large extent been realized with the advent of newer and more active hydrocracking catalysts containing highly active hydrogenating metals such as the Group VIII noble metals, supported on more active cracking bases such as the molecular sieve zeolites. With these new catalysts it is possible to achieve adequate conversion rates at temperatures considerably below 800° F., and to maintain adequate catalyst life at pressures below about 2,000 p.s.i.g. These lower pressures tend to improve the aromaticity of the product, but the concomitant lower temperatures have a reverse effect, and hence the net effect is still to produce a relatively low-octane gasoline product.

It has now been found that these newer hydrocracking catalysts, which contain both a highly active hydrogenating component and a highly active cracking base, can be advantageously employed at relatively high temperatures which favor the production of a more aromatic gasoline product by simply providing in the hydrocracking zone a sufficient concentration of ammonia to moderate the cracking activity of the catalyst. Further, it has been found that this can be accomplished without substantially affecting the catalyst deactivation rate, and thus the desired low pressures may still be employed. Other catalyst systems are in general incapable of maintaining their activity for a practical run length at the high temperatures, low pressures, and high conversions required for an economical process.

It is conventional in fixed-bed catalytic hydrocracking processes to obtain as long a run length as possible by initiating the run at a relatively low temperature, and compensating for catalyst deactivation during the run by gradually increasing the hydrocracking temperature. This procedure is disadvantageous in that the quality of the gasoline product varies considerably over the run length. One of the advantages of the present process is that the entire run can if desired be operated at substantially the same average bed temperature, while compensating for catalyst deactivation by incrementally reducing the amount of ammonia injected into the system.

As noted above, conventional hydrocracking processes also employ interstage quenching, as with cool hydrogen, to prevent exothermic runaways. This quenching technique adds considerably to the capital and operating expense of the process. For example, some local construction codes for high pressure reactor shells require heavier side walls for a given service if side nozzles for quench fluid injection are required along the length of the reactor, and the side nozzles themselves are an expensive item. By using ammonia to moderate the activity of the catalyst, instead of massive quantities of fluid quench media, side nozzles may be entirely eliminated. The small amount of ammonia required can be introduced into the reactor via small axial transfer lines which traverse the end walls of the reactor instead of the side walls. Thermal quench media cannot be introduced in this manner except by employing large, heavily insulated conduits.

For a more detailed explanation of the invention, reference is now made to the attached FIGURE 1 which is a flow diagram with an appendant reactor temperature profile illustrating the use of ammonia to achieve adiabatic hydrocracking. Catalytic hydrocracker 2 comprises a series of four catalyst beds, 4, 6, 8 and 10, each bed containing in the lower portion therof a thermocouple illustrated at 12, 14, 16, and 18. The gas oil feedstock plus hydrogen is brought in via line 20 and passed via fired heater 22 into the top of reactor 2, and passes serially through each of the catalyst beds and is withdrawn via line 24 and sent to conventional product recovery systems not shown.

The desired temperature in upper catalyst bed 4 is maintained in response to thermocouple 12 which operates valve 26 in heater fuel line 28 via temperature recorder controller 30. In the modification illustrated a temperature rise of approximately 20° F. is desired in each of the catalyst beds, but this value may vary anywhere from 5° to 50° F. or more, depending primarily upon the nature of the feedstock and the pressure employed.

To achieve adiabatic control of the process, and avoid a runaway reaction (as illustrated by dotted line 32 in the temperature profile), it is necessary either to reduce the temperature of the reactant mixture by a conventional quench technique (illustrated by dotted line 34), or to so modify the activity of the catalyst that the slope of the temperature profile is reduced at the lower end of each catalyst bed, as illustrated by line 36. The basic objective is to control the temperature rise in each catalyst bed at a predetermined value, normally between about 5° and 40° F., so as to prevent any rapid and uncontrollable runaway with attendant non-selective overcracking, irreversible catalyst damage, and possible explosions.

The effect of ammonia in moderating the hydrocracking reaction appears to be a function of its partial pressure and the instantaneous temperature level in the reactor. At low temperatures, very small amounts of ammonia are effective, while at higher temperatures much larger amounts may be required. It is hence necessary to increase the ammonia partial pressure incrementally at successively higher temperature levels in an adiabatic process. In the modification of FIGURE 1 this is accomplished by injecting ammonia at three successive levels via lines 38, 40 and 42, the amount injected in each level being controlled by valves 44, 46 and 48, operated respectively by temperature recorder controllers 50, 52 and 54, which in turn operate in response to temperatures sensed by thermocouples 14, 16 and 18, respectively. In this manner, a sufficient amount of ammonia is automatically injected at each level to maintain the predetermined temperature increase desired in each catalyst bed.

The ammonia may be ejected as pure ammonia gas, or where very small amounts are required, it may be preferable to dilute the ammonia with a carrier gas such as hydrogen so as to facilitate homogeneous mixing of the injected gas with the reactants. Also, it is not essential to use pure ammonia; other compounds readily decomposable to ammonia in the reactor may be employed as for example lower aliphatic amines such as tert butylamine, etc. In general, at temperatures between about 650° and 850° F., and at total operating pressures between about 500 and 2,500 p.s.i.g., the required ammonia partial pressures will vary between about 0.001 and 300 p.s.i.

Reference is now made to FIGURE 2 which is a flow diagram with appendant reactor temperature profile, illustrating a combined hydrocracking-reforming process wherein ammonia is employed in the lower section only in order to so modify the activity of the hydrocracking catalyst as to achieve a substantial reforming function. Reactor 60 contains four beds of hydrocracking catalyst 62, 64, 66 and 68, in which suitable thermocouples 70, 72, 74, 76 and 78 are embedded to achieve the desired temperature control in each bed. The feed-hydrogen mixture is brought in via line 80, preheated in fired heater 82, and passed in series through the four catalyst beds in reactor 60, the product being withdrawn via line 84 and sent to conventional product recovery systems not shown. Upper catalyst beds 62, 64 and 66 are operated as conventional hydrocracking units, with interstage thermal quench to achieve an overall isothermal temperature profile 86. Temperature control in upper bed 62 is achieved as in FIGURE 1 by regulating the fuel to fired heater 82 by means of motor valve 88 operating in response to temperature recorder controller 90 responsive to thermocouple 70. In beds 64 and 66, temperature control is achieved by the injection of cold hydrogen via lines 92 and 94, controlled by motor valves 96 and 98 operated by temperature recorder controllers 100 and 102, in response to thermocouples 72 and 74.

In lower catalyst bed 68 it is necessary to do two things viz., first raise the temperature of the reactants entering the top of the bed to the desired reforming temperature, and secondly, maintain the desired temperature profile in the bed. To achieve the desired initial temperature, hot hydrogen is injected into the reactor via line 104, controlled by valve 106 operated by temperature recorder controller 108 in response to thermocouple 76. In the illustrative case shown, the temperature is increased in this manner to about 840° F. At this temperature there would of course be an immediate runaway reaction unless the activity of the catalyst is suitably moderated.

To achieve this moderation, ammonia is also injected into the reactor via line 110 controlled by valve 111, operated by temperature recorder controller 112 in response to temperatures sensed at thermocouple 78. The temperature profile in bed 68 may be slightly ascending, slightly descending, or substantially flat, depending upon the relative kinetics of the hydrocracking and reforming (dehydrogenation) reactions taking place. A flat profile, indicated at 114 indicates a substantial thermal balance between exothermic and endothermic reactions, meaning that sufficient ammonia is injected to repress hydrocracking reactions into thermal balance with reforming reactions. A slightly exothermic profile, indicated by dotted line 116, can be obtained by decreasing the amount of ammonia injected, while a slightly endothermic profile, indicated at 118, may be obtained by increasing the ammonia concentration. The choice of these various alternatives depends on a great many factors including the refractoriness of the feedstock, the activity of the catalyst, its coking rate at various temperatures, and the desired product distribution and quality.

The operation described in connection with FIGURE 2 is advantageous in providing a low temperature prehydrocracking section which achieves substantially complete saturation of polycyclic aromatics, thereby minimizing polymerization and coking reactions in the high-temperature reforming section. In general, a somewhat higher octane product is obtainable by the process of FIGURE 2 as compared to that of FIGURE 1. However, the process of FIGURE 1 is advantageous in eliminating the use of extraneous heating and cooling fluids. In either case however, a higher octane product is obtainable than would be obtained using throughout the conventional quench technique illustrated by profile 34 in FIGURE 1.

In another modification of the process, the operations described in FIGURES 1 and 2 may be combined, i.e. upper beds 62, 64 and 66 of FIGURE 2 may be operated adiabatically with ammonia control as described in FIGURE 1, thereby reducing the amount of heating fluid required to achieve the desired temperature levels in bed 68.

Operative hydrocracking catalysts for use herein may comprise any desired combination of a Group VIB and/or Group VIII metal hydrogenating component supported on a refractory solid cracking base having a cracking activity higher than that indicated by a Cat-A activity index of 40. Suitable cracking bases may comprise for example the more active composites of difficultly reducible oxides such as silica-alumina, silica-magnesia, silica-zirconia, alumina-boria, silica-titania, silica-zirconia-titania, acid-treated clays and the like. Acidic metal phosphates such as aluminum phosphate may also be used. The preferred cracking bases comprise partially dehydrated, zeolitic, crystalline molecular sieves having relatively uniform pore diameters of about 6–14 A., and comprising silica, alumina and one or more exchangeable zeolitic cations. These crystalline zeolites may be used as the sole cracking base, or they may be mixed with one or more of the amorphous cracking bases such as silica-alumina cogel.

A particularly active and useful class of molecular sieve cracking bases are those having a relatively high $SiO_2/Al_2O_3$ mole-ratio, e.g., between about 2 and 10. Suitable zeolites found in nature include for example mordenite, stilbite, heulandite, ferrierite, dachiardite, chabazite, erionite, and faujasite. Suitable synthetic molecular sieve zeolites include for example those of the "B," "X," "Y," and "L" crystal types, or synthetic forms of the natural zeolites noted above, especially synthetic mordenite. For maximum activity in converting gas oils to gasoline, the preferred zeolites are those having crystal pore diameters between about 8–12 A., wherein the $SiO_2/Al_2O_3$ mole-ratio is about 3–6. A prime example of a zeolite falling in this preferred group is the synthetic "Y" molecular sieve.

The naturally occurring molecular sieve zeolites are normally found in a sodium form, an alkaline earth metal form, or mixed forms. The synthetic molecular sieves normally are prepared in the sodium form. In any case, for use as a cracking base it is preferred that most or all of the original zeolitic monovalent metals be ion-exchanged out with a polyvalent metal, or with an ammonium salt followed by heating to decompose the zeolitic ammonium ions, leaving in their place hydrogen ions and/or exchange sites which have actually been decationized by further removal of water:

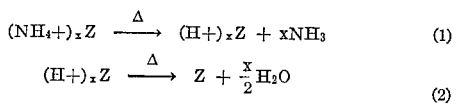

$$(NH_4+)_xZ \xrightarrow{\Delta} (H+)_xZ + xNH_3 \quad (1)$$

$$(H+)_xZ \xrightarrow{\Delta} Z + \frac{x}{2}H_2O \quad (2)$$

Hydrogen or "decationized" Y sieve zeolites of this nature are more particularly described in U.S. Patent No. 3,130,006. In some cases, as in the case of synthetic mordenite, the hydrogen forms can be prepared by direct acid treatment of the alkali metal sieves.

Mixed polyvalent metal-hydrogen zeolites may be prepared by ion exchanging first with an ammonium salt, then partially back exchanging with a polyvalent metal salt, and then calcining. Suitable polyvalent metal cations include magnesium, calcium, zinc, the rare earth metals, chromium, nickel and the like, or in general any of the polyvalent metals of Groups I–B through VIII. The preferred metals are the alkaline earths, zinc, and the rare earths.

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolites, and (b) if true decationization does occur upon further heating of the hydrogen zeolites, the decationized zeolites also possess desirable catalytic activity. Both of these forms, and the mixed form, are designated herein as being "metal-cation-deficient."

The foregoing cracking bases are compounded as by impregnation, with from about 0.05% to 25% (based on free metal) of a Group VI–B and/or Group VIII hydrogenating metal promoter, e.g., an oxide or sulfide of chromium, tungsten, cobalt, nickel, or the corresponding free metals, or any combination thereof. Preferably, small proportions, between about 0.05% and 2%, of the noble metals platinum, palladium, rhodium or iridium are employed. The oxides and sulfides of other transitional metals may also be used, but to less advantage than the foregoing.

In the case of zeolitic type cracking bases, it is desirable to deposit the hydrogenating metal thereon by ion exchange. This can be accomplished by digesting the zeolite with an aqueous solution of a suitable compound of the desired metal wherein the metal is present in a cationic form, and then reducing to form the free metal, as described for example in Belgian Patent No. 598,686.

Although as indicated above, many different hydrocracking catalysts may be used herein, it is not to be assumed that all such catalysts are equivalent, or that they will all give a commercially feasible process. For hydrocracking at temperatures below about 850° F. and in the presence of ammonia, it is highly desirable to use catalysts which have both a high cracking activity and high hydrogenating activity; otherwise it will be necessary to employ uneconomical low space velocities. For economical processes operated at about about 0.5 LHSV, the preferred catalysts are composed of a Group VIII noble metal, e.g., platinum, palladium, rhodium, iridium or ruthenium, combined by ion exchange with one of the zeolitic molecular sieve cracking bases of the Y crystal type, wherein the zeolitic cations are predominantly hydrogen and/or a polyvalent metal such as calcium, magnesium, zinc, or rare earth metals. The more conventional catalysts such as nickel or platinum on silica-alumina gel, will require low space velocities, in general below about 0.5 in order to achieve the desired conversion in the presence of ammonia.

It is preferred to maintain the hydrocracking catalyst in a substantially sulfided condition in order to achieve a gasoline product of maximum aromaticity. For this purpose it is desirable, especially in the case of noble metal catalysts, to maintain a hydrogen sulfide concentration in the entering feed-hydrogen mixture amounting to at least about 0.001 millimole per mole of hydrogen.

The hydrocracking feedstocks which may be treated herein include in general any substantially nitrogen-free mineral oil fraction boiling above the conventional gasoline range, i.e., above about 200° F. and usually above about 400° F., and having an end-boiling-point of up to about 1,000° F. This includes straight-run gas oils and heavy naphthas, coker distillate gas oils and heavy naphthas, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° F. and 900° F., having an API gravity of 20 to 35°, and containing at least about 30% by volume of acid-soluble components (aromatics +olefins). Organic nitrogen contents may range between about 0 and 50 p.p.m., preferably between about 0 and 10 p.p.m. Sulfur compounds may also be present.

The foregoing feedstocks may be treated herein under the following general process conditions:

|  | Broad range | Preferred range |
| --- | --- | --- |
| Pressure, p.s.i.g. | 500–3,000 | 800–2,000 |
| LHSV | 0.5–20 | 0.7–5 |
| H₂/Oil Ratio, MSCF/B | 4–20 | 6–12 |
| Temperature, °F.: |  |  |
|   Hydrocracking Section | 400–800 | 550–750 |
|   Reforming Section | 750–1,000 | 800–900 |
| Ammonia partial pressure, p.s.i.: |  |  |
|   Hydrocracking Section | 0–20 | 0–10 |
|   Reforming Section | 10–400 | 20–300 |

The following examples are cited to illustrate the techniques and results obtainable by the process of this invention, but are not to be construed as limiting in scope:

EXAMPLE I

In an exemplary adiabatic hydrocracking process carried out as described in connection with FIGURE 1, the significant process conditions and results are as follows:

Feedstock: Hydrofined blend of straight-run gas oil and catalytic cracking cycle oil, having the following characteristics:

| | |
|---|---|
| Gravity, °API | 32 |
| Boiling range, °F. | 410–860 |
| Aromatics, wt. percent | 34 |
| Nitrogen, p.p.m. | 12 |
| Sulfur, p.p.m. | 3500 |

*Hydrocracking catalyst.*—0.5% Pd supported on a Y molecular sieve cracking base having a $SiO_2/Al_2O_3$ mole-ratio of about 4.7, wherein about 35% of the zeolitic ion-exchange capacity is satisfied by magnesium ions (3 wt. percent MgO), about 10% by sodium ions, and the remainder (55%) by hydrogen ions. This catalyst is maintained in a sulfided condition by virtue of the sulfur in the feed.

Hydrocracking conditions (after 30 days on-stream):

| | |
|---|---|
| Pressure, p.s.i.g. | 1500 |
| LHSV | 1.5 |
| $H_2$/oil ratio, s.c.f./b. | 10,000 |

| Temperatures, °F.: | Inlet | Outlet |
|---|---|---|
| First bed | 620 | 640 |
| Second bed | 640 | 660 |
| Third bed | 660 | 680 |
| Fourth bed | 680 | 700 |

Ammonia partial pressure, p.s.i.:

| | |
|---|---|
| First bed | 0.004 |
| Second bed | 0.02 |
| Third bed | 0.16 |
| Fourth bed | 2.0 |

Under these conditions, about 60 volume-percent conversion to 400° F. end point gasoline is obtained, and the octane number (F–1+3 ml. TEL) of the $C_7$–400° F. gasoline is about 85, the aromatic content thereof being about 29.4 volume-percent.

When this feedstock is hydrocracked using conventional quench techniques to maintain an average bed temperature of about 622° F. in each catalyst bed (no ammonia added), other conditions being the same, the conversion to 400° F. end point gasoline remains about 60 volume-percent, but the leaded octane number of the $C_7$–400° F. gasoline is only about 79, and the aromatic content about 12.7 volume-percent.

EXAMPLE II

In an exemplary hydrocracking-reforming process carried out as described in connection with FIGURE 2, the significant process conditions and results are as follows:

*Feedstock.*—Same as in Example I with 200 p.p.m. of added ammonia.

*Hydrocracking catalyst.*—Same as in Example I.

Hydrocracking-reforming conditions (after 30 days on-stream):

| | |
|---|---|
| Pressure, p.s.i.g. | 1,000 |
| LHSV | 1.5 |
| $H_2$/oil ratio, s.c.f./b. | 10,000 |

| Temperatures, °F.: | Inlet | Outlet |
|---|---|---|
| First bed | 690 | 710 |
| Second bed | 690 | 710 |
| Third bed | 690 | 715 |
| Fourth bed | 840 | 840–845 |

Ammonia partial pressure, p.s.i.g.:

| | |
|---|---|
| First bed | 0.2 |
| Second bed | 0.2 |
| Third bed | 0.2 |
| Fourth bed | 150 |

Under these conditions, about 60 volume-percent conversion to 400° F. end point gasoline is obtained, and the octane number (F–1+3 ml. TEL) of the $C_7$–400° F. gasoline is about 99, the aromatic content thereof being about 57.5 volume-percent.

Results analagous to those indicated in the above examples are obtained when other catalysts, conditions and feedstocks within the purview of the disclosure are employed. The true scope of the invention is intented to be defined by the following claims.

What is claimed:

1. In a hydrocracking process wherein a petroleum hydrocarbon feedstock is passed in admixture with hydrogen through an elongated conversion zone in contact with the hereinafter defined hydrocracking catalyst at a pressure above about 500 p.s.i.g. and at an elevated temperature such that substantial exothermic hydrocracking takes place with a resultant generally accending temperature profile downstreamwardly in said conversion zone, the method of maintaining the overall exothermic temperature increase in said zone at a relatively high value while preventing a runaway exothermic reaction, which method comprises introducing at one or more intermediate points along the length of said conversion zone, and in the substantial absence of a thermal quenching medium, sufficient ammonia to maintain the overall exothermic temperature increase in said zone at a value of at least about 50° F., said hydrocracking catalyst comprising a hydrogenating component selected from the class consisting of the Group VIB and Group VII metals deposited on a refractory solid cracking base having a cracking activity in excess of that corresponding to a Cat-A activity index of about 40.

2. A process as defined in claim 1 wherein said hydrogenating component comprises a Group VIII noble metal sulfide.

3. A process as defined in claim 1 wherein said cracking base comprises a crystalline molecular sieve zeolite having a $SiO_2/Al_2O_3$ mole-ratio of at least about 2.0, and wherein the zeolitic cations thereof comprise mainly hydrogen ions and/or polyvalent metal ions.

4. A process as defined in claim 1 wherein said hydrocracking catalyst comprises a Group VIII noble metal sulfide hydrogenating component deposited upon a Y molecular sieve zeolite wherein the zeolitic cations comprise mainly hydrogen ions and/or polyvalent metal ions.

5. In a hydrocracking process wherein a gas oil feedstock is passed in admixture with hydrogen through an elongated conversion zone in contact with the hereinafter defined hydrocracking catalyst at a pressure above about 500 p.s.i.g. and at an average temperature above about 500° F. such that substantial hydrocracking takes place with a resultant generally accending temperature profile downstreamwardly in said conversion zone, method of maintaining the overall exothermic temperature increase in said zone at relatively high value while preventing a runaway exothermic reaction, thereby promoting the formation of a high octane highly aromatic gasoline product, which method comprises introducing at one or more intermediate points along the length of said conversion zone, and in the substantial absence of a thermal quenching medium, sufficient ammonia to maintain the overall exothermic temperature increase in said zone at a value of at least about 50° F., said hydrocracking catalyst comprising a Group VIII metal hydrogenating component deposited on a refractory solid cracking base having a cracking activity in excess of that corresponding to a Cat-A activity index of about 40 and comprising a crystalline molecular sieve zeolite having a $SiO_2/Al_2O_3$ ratio of at least about 2.0, the zeolitic cations of which are selected mainly from the class consisting of hydrogen ions and polyvalent metal ions.

6. A combined hydrocracking-reforming process for converting a gas oil feedstock to a high-octane, aromatic gasoline product, which comprises passing said feedstock in admixture with hydrogen through an elongated conversion zone in contact with a hydrocracking catalyst at a pressure above about 500 p.s.i.g., maintaining in an upstream portion of said conversion zone hydrocracking temperatures between about 400° and 750° F., such that substantial exothermic hydrocracking takes place, maintaining in a downstream portion of said conversion zone a relatively higher average temperature, between about 800° and 1,000° F., such that substantial reforming takes place, and continuously adding ammonia to the reactant stream in said conversion zone at one or more points between said upstream and downstream portions without significant thermal quenching so as to decrease the net exothermicity of the reaction in said downstream portion, said hydrocracking catalyst comprising a Group VI–B and/or Group VIII metal hydrogenating component deposited upon a refractory solid cracking base having a cracking activity in excess of that corresponding to a Cat-A activity index of about 40.

7. A process as defined in claim 6 wherein said hydrogenating component comprises a Group VIII noble metal sulfide.

8. A process as defined in claim 6 wherein said cracking base comprises a crystalline molecular sieve zeolite having a $SiO_2/Al_2O_3$ mole-ratio of at least about 2.0, and wherein the zeolitic cations thereof comprise mainly hydrogen ions and/or polyvalent metal ions.

9. A process as defined in claim 6 wherein said hydrocracking catalyst comprises a Group VIII noble metal sulfide hydrogenating component deposited upon a Y molecular sieve zeolite wherein the zeolitic cations comprise mainly hydrogen ions and/or polyvalent metal ions.

10. A process as defined in claim 6 wherein a generally isothermal temperature profile is maintained in the upstream portion of said conversion zone by the intermittent injection of a quench fluid, and wherein the relatively higher temperature in said downstream portion is achieved at least in part by the injection of a heating fluid into said reactant stream.

References Cited

UNITED STATES PATENTS

| | | | |
|---|---|---|---|
| 2,120,295 | 6/1938 | Pier et al. | 208—108 |
| 3,213,013 | 10/1965 | Arey | 208—111 |

ABRAHAM RIMENS, *Primary Examiner.*

DELBERT E. GANTZ, *Examiner.*

UNITED STATES PATENT OFFICE
CERTIFICATE OF CORRECTION

Patent No. 3,368,964                                    February 13, 1968

Norman C. Ch'in et al.

It is hereby certified that error appears in the above numbered patent requiring correction and that the said Letters Patent should read as corrected below.

Column 3, line 18, for "507 F." read -- 50° F. --; column 6, line 19, for "about about" read -- above about --; line 27, for "or", second occurrence, read -- on --; column 8, line 28, for "VII" read -- VIII --.

Signed and sealed this 22nd day of April 1969.

(SEAL)
Attest:

Edward M. Fletcher, Jr.                                    EDWARD J. BRENNER

Attesting Officer                                              Commissioner of Patents